June 17, 1930.   H. J. KUHLMAN   1,764,686
GATHERING, SNAPPING, AND HUSKING ROLLS FOR CORN HARVESTERS
Filed Oct. 5, 1927
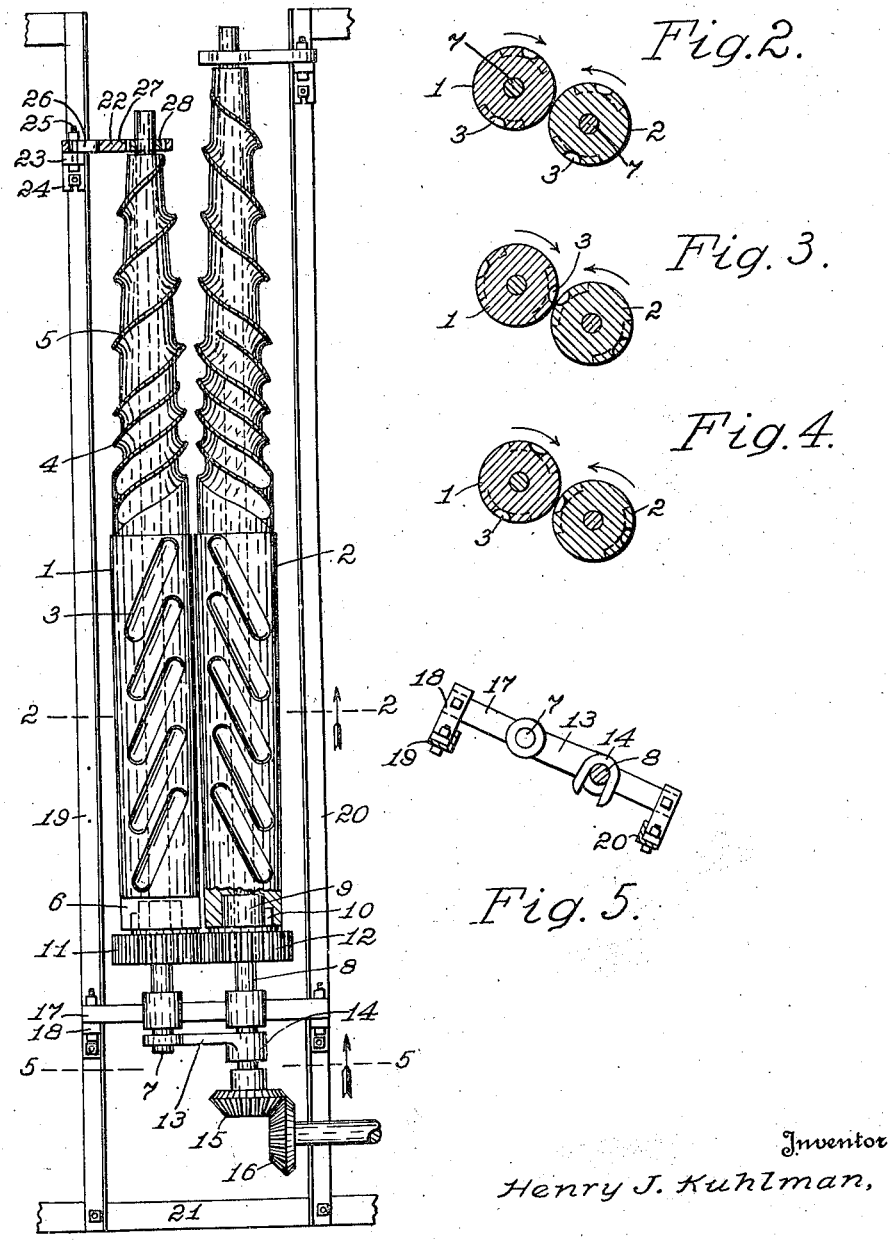
Inventor
Henry J. Kuhlman,
By G. C. Kennedy,
Attorney Patented June 17, 1930

1,764,686

UNITED STATES PATENT OFFICE

HENRY J. KUHLMAN, OF COLESBURG, IOWA

GATHERING, SNAPPING, AND HUSKING ROLLS FOR CORN HARVESTERS

Application filed October 5, 1927. Serial No. 224,149.

My invention relates to improvements in corn harvesters, and the object of my improvements is to supply in such a machine coacting devices adjustably assembled for gathering, snapping and husking corn in successive operations, by the simplest means and in the most effective manner.

This object I have accomplished by the means which are hereinafter described and claimed, and which are illustrated in the accompanying drawings, in which Fig. 1 is a top plan of my said coacting devices as seen at a slight angle to the vertical to most effectively display them. Figs. 2, 3 and 4 are like cross sections of the coacting rolls taken on the broken line 2—2 of said Fig. 1, but showing different stages of coaction of the rolls according to relative changes of movement or of an adjustment thereof. Fig. 5 is a cross section of the device taken on the broken line 5—5 of Fig. 1.

My invention is not restricted to the precise construction and arrangement of parts herein shown and described, nor to the various details thereof, as the same may be modified or rearranged in various particulars without departing from the spirit and scope of my invention, one practical embodiment of which has been herein illustrated and described without attempting to show all of the various forms and modifications in which my invention might be embodied.

I have disclosed herein only the specific means employed in a corn harvester for gathering, snapping from the stems, and husking ears of corn in the field, as the associated constructions and mechanisms aside from these means may be varied considerably.

My invention comprises the associated and coacting rolls 1 and 2 which are rotatably mounted for reversed rotations upon spaced frame angle bars 19 and 20, longitudinal with the machine, connected by a bar 21 at the rear, the forward ends of the rolls not being inclosed, in order to afford clearance for them to receive stems or stalks of hilled corn in a row between them during the forward progress of the machine as propelled by any suitable means. The bars 19 and 20 are rigidly connected together, but the rolls are so mounted thereon as to permit of initial adjustments of their forward ends apart, by the use of adjustable bearing devices on the angle bars.

The rear ends of the rolls are mounted for but slight lateral movements in the process of relative adjustments, but the forward ends have bearing devices which permit of greater scope of such adjustments. The rolls 1 and 2 preferably are constructed hollow axially to receive fixedly therethrough their axial shafts 7 which project at both ends thereof, but the roll 2 is somewhat longer than the roll 1, and while the rolls are substantially parallel, being but slightly spaced apart peripherally, the pair are arranged with the roll 1 at a higher level than the roll 2, as may be seen in the relative arrangement thereof in Fig. 2.

The bearing devices at the rear may be of any desired kind, but are shown as short standards 17 having angular feet bolted rigidly on the angle bars 19 and 20, and a cross bar 17 is bolted at its ends to the said standards, and contains integral apertured bearings to receive the shafts 7 of said rolls 1 and 2. The rear part of the shaft 7 of the roll 2 projects farther rearwardly beyond its said bearing than the other shaft 7 of the roll 1, and carries a terminal bevel gear 15 in mesh with a bevel pinion 16 on an end of a driving shaft which is rotated by a motor or other means not shown.

Forward of the bearing bar 17 intermeshing like spur gears 11 and 12 are fixed upon the said shafts 7, it being understood that the shaft 7 which carries the roll 2 is also slidable longitudinally in its bearings for a purpose to be disclosed. To the rear of the bearing bar 17 one end of an arm 13 is rotatably mounted upon the rear end of the shaft 7 which carries the roll 1, and has a terminal downwardly projecting fork 14 which rides upon the other shaft 7 between said bearing bar 17 and said gear wheel 15, tending to keep them spaced apart while the gears 11 and 12 are in mesh, but when the arm 13 is swung upwardly to disengage its fork 14, the shaft 7 on the right may be moved forwardly in its bearings to permit unmeshing of the gears 11 and 12, a portion of the rear end of the roll 1 being excised at 6, so that when the roll 1 is turned appropriately, the space at 6 permits clearance for this longitudinal movement of the gear wheel 12 in unmeshing.

The forward bearings for the rolls 1 and 2 are alike but reversed relative to each other. Each bearing includes a short standard 23 having furcated feet 24 to receive bolts for some longitudinal adjustments or quick separation of the standards. The numeral 22 denotes a bearing bar whose outer end is longitudinally slotted at 26 to receive a bolt 25 for lateral adjustments of the arm or bar 22 relative to the standard 23. The inner end of the bar 22 is apertured at 27 to receive a sleeve 28 loosely mounted therein, the sleeve 28 receiving the forward end of the shaft 7. It will be seen that initially the shafts 7 with their rolls 1 and 2 may be slightly adjusted in their spacing to and from each other as may be necessary in operating upon corn stalks and ears which are of different characteristics, such as being more or less hard or soft, as is the case some times in case of early frosts, excessive rain or otherwise. The roll 2 may be adjusted in longitudinal change of position to permit of unmeshing the gears 11 and 12, by loosening the bolt which fastens the standard 23, and moving the standard forwardly until the shaft 7 is returned to its former position.

The rolls 1 and 2 are fixed to the shafts 7 as against rotation thereon by hollowing the rear ends thereof to permit the fitting in such hollows of hub parts 9 on the gears 11 and 12 and splines 10 which are parts of said hubs.

The two rolls 1 and 2 are by said gears 11 and 12 rotated reversely as indicated by the arrows in said Figs. 2 to 4, and the rolls are peripherally shaped to be alike except that the roll 2 is somewhat longer in its forward part than the roll 1, so that the bearing seat for the roll 2 is spaced forwardly or offset relatively to the opposite bearing means 23—22. The forward parts of both rolls are conical, or in the shape of elongated conical frusta 5 having thereon the spiral threads of wide pitch as shown. These threads merge continuously into threads of narrower pitch on portions of the rolls to the rear which are cylindrical at 4 and extend as far as a slight annular shoulder transversely alined on both rolls. The parts 5 and 4 will be described respectively as the gathering and snapping portions of said rolls.

The portions 5 and 4 of said rolls 1 and 2 are approximately each one fourth of the length of the roll, and the portion or husking part of each roll to the rear of the portions 5 and 4 is approximately one half of the length of the roll. This portion is slightly coned rearwardly and in each roll has on opposite sides a number of obliquely disposed circumferential elongated hollows 3 with angular edges all around. These hollows are alined longitudinally and have an inclination or obliquity of relatively small degree relative to the axes of the rolls and positioned on the respective rolls to all converge at their forward ends. It will be seen that this arrangement of the hollows 3 permits the hollows which are opposite in each pair on the two rolls to coincide with each other when the rolls are rotated toward each other from the positions shown in Fig. 2 to those shown in Fig. 3, so that in so coinciding, the hollows have their parts from front to rear successively coincide or open into each other. This relative positioning of the hollows is suitable for the husking operation of ears of corn having a certain consistency as to being dry and hard where a maximum width of grip is attained in seizing and pulling off the dry husks. To adjust the relative positions of the opposite hollows 3 to narrow their meeting openings or to cause the hollow 3 on one roll to meet only the roll periphery between hollows 3, in order to strip the husks from ears of corn or differing degrees of softness or of different diameters, adjustments may be effected whereby the rolls 1 and 2 may be stepped in their circumferential adjustments by reason of resetting the gears 11 and 12 tooth by tooth or by steps of pluralities of their teeth at will. This is done by swinging up the arm 13 to remove its fork 14 from the shaft 7 of the roll 2, so that the shaft, after an adjustment of its forward bearing longitudinally, will allow of moving ahead the roll 2, to unmesh the gears 11 and 12, as also the bevel gears 15 and 16, the excised part or space 6 on the roll 1, after turning this roll appropriately, giving clearance for the said movement of the gear 12. When the gears 11 and 12 are thus unmeshed, the roll 2 may be turned one or more teeth and the process reversed to again place said gears in mesh, upon which the arm 13 may be swung downwardly to again cause its fork 14 to ride upon and serve as a stop for the shaft 7 and gear 15 after the shaft 7 of the roll 2 is returned by sliding it longitudinally in its bearings.

In the operation of the corn harvester, the machine is propelled forwardly astride of a row of hills of corn, the stalks of which successively are received in the relatively wide interspace at the front of the gathering parts 5 of the rolls 1 and 2. The interspace, because of the conicity of these parts of the rolls, gradually narrows between the threads thereof, tending to displace the stalks into alinement along the rolls in each assemblage of stalks of a hill. This action is continued as the stalks are successively received in the interspaces between threads of the roll parts 4, these interspaces being approximately alike, with a reduced space in each to receive a single stalk normally, and the interspaces being narrow enough to grippingly inclose the stalk below ears thereon to successively force or snap off the ears therefrom, so that in the forward advance of the machine, the now separated ears are received in succession upon and in the longitudinal trough between the rolls 1 and 2 along their longer rear portions which contain the husking hollows or recesses 3. The rolls 1 and 2 are located in an inclined plane longitudinally axially, the shorter roll 1 being at a higher axial level than the roll 2. As the forward part of the roll 2 is projected in advance of the roll 1, being longer, the relative positions of these parts of the rolls favor the reception of the corn stalks therebetween so as to include stalks which stray laterally, and also to serve in drawing the stalks into more or less alinement longitudinally as they are received between the rolls. The stalks are deflected on their reception upon the elongated forward end of the roll 2 and thence drawn between the rolls.

When the separated ears in turn pass along the upper trough between the rolls 1 and 2 at the rear portions containing the hollows 3, their husks are gripped by the clamping actions of the successively advancing angular edges of the rolls at these places, and in this succession the husks are stripped off so that the ears are delivered at the rear of the rolls cleaned of husks and upon any suitable traveling conveyer positioned there to receive them for transportation to an adjoining wagon or other receptacle.

It will be observed, that when the roll 2 is steppingly adjusted circumferentially relative to the roll 1 as hereinbefore described, the position of each hollow 3 on the roll 2 is changed circumferentially relative to the like positioned hollow 3 on the roll 1 in the same laterally arranged pair, so that the opening of each into the other is correspondingly narrowed, or in fact so that the opening of one hollow is against the peripheral space between hollows, the latter adjustment being shown in said Fig. 4. In this latter adjustment, the grip of the angular edges of the single hollow against the smooth surface of the opposite roll is least, fitting the action for husking smaller ears or soft corn, preventing crushing of the cobs and dispersal of shelled kernels.

The roll construction is such as to thus perfect the successive operations of the device and in a minimum length of time. This results in a cheapening of the process, and permits a lightening of the machine with corresponding inexpensiveness in its purchase price. As all three operations of gathering, snapping and husking of ears are thus effected successively by the use of but one pair of appropriately shaped and coacting adjustable rolls, but a single man need be used in the conduct of a harvester, instead of several as in many present machines.

It should be noted, that when the roll 2 is steppingly adjusted circumferentially relatively to the roll 1 by the means described, that in varying the relative positions of the pairs of hollows 3, the relative positions of the different parts of the thread on the roll portions 5 and 4 are changed, whereby the thread on one roll will become intermediate between parts of the thread on the other, and thus the interspaces are narrowed by a constriction which varies the action of the rolls in gathering and snapping, suiting the action also adjustingly for the handling of stalks and ears of different characteristics, as stated.

Having described my invention, what I claim as new and desire to secure by Letters Patent, is:

1. In a device of the character described, a pair of coacting rolls mounted in juxtaposition, the forward part of each roll having a thread of a relatively wide pitch changing along the intermediate part of the roll into a pair of threads, and the rear part of each roll having alined therealong rows of obliquely disposed elongated hollows with angular edges.

2. In a device of the character described, a pair of coacting reversible rolls mounted adjustably in juxtaposition, the forward part of each roll shaped as a conic frustum, this part having a thread of a relatively wide pitch, and having a thread of like pitch interposed at the rear portion of its length, and the rear portion of each roll being for husking only and substantially cylindrical with oppositely positioned longitudinal rows of elongated oblique hollows with angular edges, and means for relatively adjusting the position of one roll circumferentially relative to the other roll to place said oblique hollows in different positions of partial registration for treating ears of corn of different sizes for husking them without removing kernels therefrom.

3. In a device of the character described, a pair of reversely rotatable rolls mounted for transportation and having like meshing end gears, means for unmeshing said gears and then circumferentially adjusting the remeshing of the gears to vary the rotational coacting arrangements of the rolls, consisting in providing a segmental lateral depression in one roll, to loosely receive slidingly teeth of the other roll, and said rolls having surface projections and hollows arranged therealong in succession to coact varyingly in any of such adjusted arrangements of the rolls, whereby the rolls function in the successive gathering of eared stalks during the forward progression of the device, then snapping the ears from the stalks, then husking the ears.

4. In a device of the character described, a pair of coacting rolls rugated at their receiving ends for gathering and snapping purposes only, and having their delivery end parts cylindrical and having on opposite sides longitudinal rows of alined oblique elongated depressions with angular edges, the depressions on one roll being oppositely disposed to the depressions on the other roll, and the rolls being arranged for adjusting their relative positions circumferentially to place their depressions in differently adjusted positions of coacting registration, to permit the rolls to be used for husking ears of corn of differing sizes and shapes.

In testimony whereof I affix my signature.

HENRY J. KUHLMAN.